United States Patent Office 3,183,279
Patented May 11, 1965

3,183,279
PURIFICATION OF 2-METHYLNAPHTHALENES BY SELECTIVE OXIDATION OF THEIR ISOMERS
Ivor W. Mills, Glenolden, and John J. Melchiore, Wallingford, Pa., assignors to Sun Oil Company, Philadelphia, Pa., a corporation of New Jersey
No Drawing. Filed May 11, 1961, Ser. No. 109,271
6 Claims. (Cl. 260—674)

This application is a continuation-in-part of application Serial No. 788,048, filed January 21, 1959, and of application Serial No. 846,534 filed October 15, 1959, both of which are now abandoned.

The present invention involves contacting a mixture of a 2-methylnaphthalene, i.e., an alkylnapthalene having a methyl group in the 2-position, and an isomer or isomers thereof, with oxygen to obtain selective oxidation of the isomers, leaving the 2-methylnaphthalene unoxidized.

In one embodiment, 2,6-dimethylnaphthalene is purified by selective oxidation of its isomers. In another embodiment, 2-methylnaphthalene is purified by selective oxidation of 1-methylnaphthalene. The embodiment of the invention wherein 2,6-dimethylnaphthalene is purified will be described first.

By known procedures, such as distillation, crystallization, solvent extraction, etc., 2,6-dimethylnaphthalene can be recovered in concentrated form from hydrocarbon mixtures such as coal tar, products of cracking of petroleum hydrocarbons, etc., Various useful conversion products, such as oxygen-containing products of conversion of the methyl groups, can be obtained from 2,6-dimethylnaphthalene, and it is frequently desirable that the latter be relatively pure for such use, in order to take advantage of the beneficial properties provided by the 2,6 positions of the substituents in the conversion products. To obtain sufficiently pure 2,6-dimethylnaphthalene by known methods is usually not feasible from an economic standpoint, and there is therefore need for a superior purification procedure.

According to the present invention, such procedure is provided by contacting impure 2,6-dimethylnaphthalene in liquid phase with molecular oxygen in order to selectively oxidize isomers of that hydrocarbon, and separating unoxidized 2,6-dimethylnaphthalene from the oxidation products.

It is known in the art, as disclosed in Patent No. 2,779,807, to purify alkylnaphthalenes by contacting with peracetic acid for example, to react the peracetic acid with impurities, and separating the purified alkylnaphthalenes from the reaction products by distillation, adsorption, or extraction with diethylene glycol or aqueous methanol. However, there is no disclosure in this patent that 2,6-dimethylnaphthalene can be separated from its isomers in this manner. The process of the invention is advantageous in that it produces an excellent separation of 2,6-dimethylnaphthalene, and is further advantageous as compared with the patented process in that pure 2,6-dimethylnaphthalene can if desired be crystallized directly from the oxidation medium, without necessity for distillation, adsorption or extraction as required in the patented process.

The oxidation according to the invention is carried out at a temperature at which isomers of 2,6-dimethylnaphthalene are selectively oxidized, leaving unoxidized at least a portion of that hydrocarbon which is contained in the charge stock. Such temperature varies according to the other conditions of the oxidation. For example, at relatively low catalyst concentration, higher temperatures can be employed without excessive oxidation of 2,6-dimethylnaphthalene. Preferably the temperature is within the approximate range from 50 to 145° C., more preferably 80 to 130° C., but other temperatures can be used in some cases. If no solvent is employed in the oxidation, a temperature above the melting point of the charge is used.

The pressure at which the oxidation is carried out is not critical, and atmospheric pressure will usually be preferred unless higher pressure, e.g., up to 500 p.s.i.g. or higher, is needed to maintain constituents of the reaction mixture in liquid phase.

It is essential that molecular oxygen be employed as the oxidizing agent. Diluents such as nitrogen can be present, but it is preferred that substantially pure oxygen be employed. Molecular-oxygen containing oxidizing agents, as known in the art for oxidations of hydrocarbons, are generally suitable. The oxygen rate is preferably in the range from 0.05 to 1.0 liter per minute per 25 grams of alkylnaphthalene feedstock, but other amounts can be used.

The oxidation is preferably performed in the presence of an oxidation catalyst. The known catalysts for liquid phase oxidation of alkyl aromatic compounds to the corresponding carboxyl aromatic compounds are generally suitable. Example of such catalysts are disclosed in Patent No. 2,245,528, issued June 10, 1941, to Donald J. Loder. Preferred catalysts are the known cobalt oxidation catalysts, e.g., cobalt acetate, cobalt naphthenates, etc. nickel, iron, manganese, copper, chromium and vanadium compounds, e.g., acetates, butyrates, valerates, naphthenates, etc., are within the scope of the invention. Hydrated salts may be employed. The amount of catalyst may vary with the other conditions; 1 to 80 wt. percent based on hydrocarbon charge is preferred, but other amounts may be used; 10 to 60 wt. percent is particularly preferred.

The oxidation can be carried out in the presence or absence of a solvent for the hydrocarbon charge; preferably a solvent is used. Following the oxidation, the 2,6-dimethylnaphthalene is in one embodiment separated from the oxidation products by crystallization of that hydrocarbon from a solution of the oxidation products in a crystallization solvent. The latter solvent is preferably the same solvent that was employed in the oxidation, though it can also be a solvent added subsequent to the oxidation, for example in a case where no solvent is present during the oxidation.

Suitable solvents for use in the oxidation include organic compounds which are liquid at the oxidation conditions, and not excessively subject to oxidation at those conditions, and which have substantial capacity for dissolving dimethylnaphthalenes. Suitable solvents include carboxylic acids such as acetic acid, propionic acid and butyric acid, esters such as ethyl acetate, etc., and various other solvents whose suitability is readily determined by a person skilled in the art. When butyric acid is the solvent, care is taken that the reaction conditions are mild enough that the solvent is not excessively decomposed.

It is conventional to activate oxidation catalysts with bromine compounds or other activators. This may be done in the process of this invention and the use of an activator will permit the use of lower reaction temperatures, for example, 50° C. It is to be emphasized, however, that no activator is necessary and a nonactivated catalyst often provides better selectivity. Furthermore, the use of bromine compounds requires the use of corrosion resistant materials which cause increased expense in addition to the expense of the activator itself.

Reaction times are controlled to obtain the maximum amount of the desired product. At lower temperatures in the operative range, longer contact periods are permissible without encountering excessive conversion of the 2-methylnapthalene. Conversely, at higher temperatures, reaction times must be shortened. Broadly speaking, the time may vary from one half hour to twelve hours, with a range of one and one half to four hours being preferred.

The nature of the oxidation products may vary depending on the oxidation conditions. One or both of the methyl groups in position isomers of the 2,6-dimethylnaphthalene may be oxidized to aldehyde or to carboxyl groups. The oxidation products can be separated from the unoxidized hydrocarbon by suitable procedure based upon the differences in properties between those products and the unoxidized hydrocarbon. A preferred separation procedure involves crystallizing the latter from a solvent, leaving the oxidation products dissolved in the solvent, and filtering the crystals. Any suitable solvent can be used, e.g., aldehydes such as acetaldehyde, ketones such as methyl ethyl ketone, carboxylic acids such as acetic acid, hydrocarbons such as pentane or benzene, esters such as ethyl acetate, etc. Alternative separation procedure involves filtration, in the absence of a solvent, of the solid oxidation products from the liquefied 2,-6,-dimethylnaphthalene. Distillation or other separation procedures can also be employed, but crystallization from the same solvent that is used in the oxidation is the preferred procedure.

The oxidation products can be separated from crystallization solvent, if such is employed, by distillation of the latter, or by other suitable procedure. These products, whether aldehydes or acids, are useful for various purposes which will be apparent to the person skilled in the art. Polyfunctional products can be converted by known procedures to various synthetic resins of the polyester, polyamide, or polyurethane type, etc. Monofunctional products can be subjected to further, more severe oxidation to produce polyfunctional products.

The purified 2,6-dimethylnaphthalene can be converted to 2,6-naphthalic acid by known procedures for partial oxidation of the methyl groups to carboxyl groups, and the product is useful for example in the production of polyesters having superior properties to those obtained with impure 2,6-naphthalic acid obtained by oxidation of impure 2,6-dimethylnaphthalene. The purified 2,6-dimethylnaphthalene has superior utility in other applications also.

The following examples illustrate the invention:

*Example 1*

Impure 2,6-dimethylnaphthalene containing about 20% of impurities including position isomers of 2,6-dimethylnaphthalene and having melting point of 96° C., as compared with the melting point of 110–111° C. for pure 2,6-dimethylnaphthalene, is contacted in acetic acid solution with substantially pure oxygen at 80° C. in the presence of cobaltous acetate as catalyst. The amounts of materials are: 5 grams of impure 2,6-dimethylnaphthalene, 50 ml. of glacial acetic acid and 0.6 gram of cobalt acetate. The contacting is continued for 2 hours at an oxygen rate of 5 ml. per per gram of hydrocarbon per minute. The oxygen is stopped and the reaction mixture cooled to room temperature to precipitate 1.7 grams of pure 2,6-dimethylnaphthalene having melting point of 111–112° C. The yield is about 40% based on 2,6-dimethylnaphthalene in the charge.

To determine the effect of the oxidation, the above procedure is repeated omitting the oxidation. The precipitate obtained has melting point of 96° C., showing no substantial purification.

The yield of pure 2,6-dimethylnaphthalene can be increased by reducing the severity of the oxidation, e.g., by reducing the reaction time, the temperature, the oxygen rate, or the catalyst concentration.

Generally similar results with respect to oxidation of position isomers are obtained in operation at 120° C. in the absence of a solvent for the hydrocarbons; the reaction time, the catalyst concentration or the oxygen rate being reduced in order to limit the extent of the oxidation that would otherwise occur at the higher temperature.

Generally similar results are also obtained using other solvents, as disclosed previously, in the oxidation and crystallization steps.

In the embodiment of the invention which involves the selective oxidation of 1-methylnaphthalene in mixtures with 2-methylnaphthalene, the oxidation is preferably carried out under the same reaction conditions as in the embodiment wherein 2,6-dimethylnaphthalene is purified by selective oxidation of its isomers. The separation of unoxidized 2-methylnaphthalene from the oxidation products is performed in a generally similar manner to that employed with 2,6-dimethylnaphthalene. The 2-methylnaphthalene and 1-naphthoic acid which are obtained can be employed for their known uses.

The following examples further illustrate the invention:

*Example 2*

25 grams of a mixture of 32 wt. percent 2-methylnaphthalene and 68 wt. percent 1-methylnaphthalene was dissolved in 250 mls. of acetic acid. The solution was placed in a 3 necked flask, equipped with a motor driven stirrer and a reflux condenser. 12.5 grams (50 wt. percent) of $Co(OAc)_2 \cdot 4H_2O$ was added. Oxygen was bubbled through the reactants at the rate of 300 cc./min. with stirring at 1300 r.p.m. Temperature was maintained at 114±2° C. The following results were observed:

| Time(Hrs.) | 1-Methyl-naphtha-lene (wt. percent) | 2-Methyl-naphtha-lene (wt. percent) | 1-Naphthoic Acid (wt. percent) | Naphthaldehydes (wt. percent) |
|---|---|---|---|---|
| 0 | 68 | 32 | 0 | 0 |
| 2 | 1.0 | 25 | 43 | 32 |
| 6 | 0 | 13 | 60 | 27 |

Products were analyzed by vapor phase chromatography and by isolation and weight of acidic and non-acidic products.

*Example 3*

The above example is repeated except that 6.25 grams (12 wt. percent) of $Co(OAc)_2$ was used and propionic acid was used as the solvent. Temperature was maintained at 122±2° C. The following results were observed:

| Time (Hrs.) | 1-Methyl-naphtha-lene (wt. percent) | 2-Methyl-naphtha-lene (wt. percent) | 1-Naphthoic Acid (wt. percent) | Naphthaldehydes (wt. percent) |
|---|---|---|---|---|
| 0 | 68 | 32 | 0 | 0 |
| 1.8 | 26 | 24 | | |
| 6 | 3 | 16 | 65 | 16 |

The invention in its general aspect involves the purifying of a 2-methylnaphthalene, i.e., an alkylnaphthalene having a methyl group in the 2-position by contacting a mixture thereof with a 1-methylnaphthalene, i.e., an alkylnaphthalene having a methyl group in the 1-position, with molecular oxygen in the presence of a catalyst for liquid phase oxidation of alkyl aromatic compounds, thereby to selectively oxidize the 1-methylnaphthalene, and separating the unoxidized 2-methylnaphthalene from the oxidation products. The invention is applicable to the obtaining in purified form of a single 2-methylnaphthalene isomer, e.g., 2-methylnaphthalene itself, 2,6-dimethylnaphthalene, etc., or a mixture of such isomers, e.g., 2,6- and 2,7-dimethylnaphthalenes, etc., from a mixture containing one or more 1-methylnaphthalenes, e.g., 1-methylnaphthalene itself, 1,8-dimethylnaphthalene, 1,4-dimethylnaphthalene etc. The purification is believed to be most effective for 2-methylnaphthalenes having no alkyl group in a 1-position. A 1-position, as referred to herein, signifies attachment to a nuclear carbon atom which is not itself common to the two rings but which is directly connected to a carbon atom which is common to the two rings. A 2-position, as referred to herein, signifies attachment to a nuclear carbon atom which is not itself common to the two rings and which is not directly attached to a carbon atom which is common to the two rings.

The invention claimed is:
1. Process for purifying 2,6-dimethylnaphthalene which comprises contacting it in liquid phase with moleclular oxygen at a temperature in the range from 50 to 145° C. in the presence of a metallic catalyst for liquid phase partial oxidation of alkyl aromatic compounds to carboxylic acids, thereby to selectively oxidize isomers of 2,6-dimethylnaphthalene, and separating unoxidized 2,6-dimethylnaphthalene from the oxidation products.
2. Process according to claim 1 wherein said contacting is in the presence of a cobalt catalyst.
3. Process according to claim 1 wherein said contacting is in the presence of a lower fatty acid solvent, and unoxidized 2,6-dimethylnaphthalene is subsequently precipitated from a solution of the oxidation products in said solvent.
4. Process for purifying an alkylnaphthalene having a methyl group in the 2-position which comprises contacting a mixture of said alkylnaphthalene and an alkylnaphthalene having a methyl group in the 1-position, in liquid phase with an oxidizing agent consisting essentially of molecular oxygen at a temperature in the range from 50 to 145° C. in the presence of a metallic catalyst for liquid phase oxidations of alkyl aromatic compounds to carboxylic acids, thereby to selectively oxidize alkylnaphthalene having a methyl group in the 1-position, and separating the first-named alkylnaphthalene from the oxidation products.
5. Process according to claim 4 wherein said first-named alkylnaphthalene is selectively crystallized from a solution containing said first-named alkylnaphthalene and said oxidation products.
6. Process for purifying an alkylnaphthalene having a methyl group in the 2-position which comprises contacting a mixture of said alkylnaphthalene and an alkylnaphthalene having a methyl group in the 1-position, in liquid phase with an oxidizing agent consisting essentially of molecular oxygen at a temperature in the range from 50 to 145° C. in the presence of a cobalt catalyst and an alkanoic acid solvent having 2 to 4 carbon atoms for a period in the range from ½ hour to 12 hours, thereby to selectively oxidize alkylnaphthalene having a methyl group in the 1-position, and filtering the first-named alkylnaphthalene from said solvent containing the dissolved oxidation products.

References Cited by the Examiner

UNITED STATES PATENTS

| | | | |
|---|---|---|---|
| 2,245,528 | 6/41 | Loder | 260—524 |
| 2,771,491 | 11/56 | Conner | 260—674 |
| 2,833,816 | 5/58 | Saffer et al. | 260—524 |
| 2,850,548 | 9/58 | Thelin et al. | 260—674 |
| 2,930,802 | 3/60 | Aries | 260—524 |
| 2,963,508 | 12/60 | Baker et al. | 260—524 |

FOREIGN PATENTS

| | | |
|---|---|---|
| 666,709 | 2/52 | Great Britain. |
| 758,665 | 10/56 | Great Britain. |
| 798,619 | 7/58 | Great Britain. |

ALPHONSO D. SULLIVAN, *Primary Examiner.*